(12) United States Patent
Tsuchiya et al.

(10) Patent No.: US 10,036,295 B2
(45) Date of Patent: Jul. 31, 2018

(54) AQUEOUS UREA SOLUTION SUPPLY DEVICE AND AQUEOUS UREA SOLUTION SUPPLY METHOD FOR INTERNAL COMBUSTION ENGINE

(71) Applicants: TOYOTA JIDOSHA KABUSHIKI KAISHA, Toyota-shi, Aichi-ken (JP); KABUSHIKI KAISHA TOYOTA JIDOSHOKKI, Kariya-shi, Aichi-ken (JP)

(72) Inventors: Tomihisa Tsuchiya, Toyota (JP); Naoya Okamoto, Toyota (JP); Takahiro Kiyofuji, Toyota (JP); Sakutaro Hoshi, Anjo (JP)

(73) Assignees: TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 102 days.

(21) Appl. No.: 15/164,078

(22) Filed: May 25, 2016

(65) Prior Publication Data
US 2016/0348555 A1 Dec. 1, 2016

(30) Foreign Application Priority Data
May 27, 2015 (JP) .................. 2015-107571

(51) Int. Cl.
*F01N 3/00* (2006.01)
*F01N 3/10* (2006.01)
(Continued)

(52) U.S. Cl.
CPC .............. *F01N 3/208* (2013.01); *F01N 9/00* (2013.01); *F01N 2610/02* (2013.01);
(Continued)

(58) Field of Classification Search
CPC ........ F01N 3/206; F01N 3/2066; F01N 13/02; F01N 2610/00; F01N 2610/02;
(Continued)

(56) References Cited

U.S. PATENT DOCUMENTS

| 2013/0032214 A1 | 2/2013 | Saby et al. |
| 2014/0238504 A1 | 8/2014 | Kregling et al. |
| 2015/0019108 A1* | 1/2015 | Hendrickson ........... F01N 11/00 701/102 |

FOREIGN PATENT DOCUMENTS

| EP | 2 682 579 A2 | 1/2014 |
| EP | 2 685 072 A1 | 1/2014 |

(Continued)

*Primary Examiner* — Audrey K Bradley
*Assistant Examiner* — Diem Tran
(74) *Attorney, Agent, or Firm* — Oliff PLC

(57) ABSTRACT

A aqueous urea solution supply device for an engine is provided with a tank that stores aqueous urea solution, a valve configured to add the aqueous urea solution to exhaust gas, and a passage configured to supply the aqueous urea solution in the tank to the valve. When a pressure of the aqueous urea solution supplied to the valve is equal to or lower than a predetermined pressure and the amount of the aqueous urea solution in the tank is equal to or smaller than a predetermined threshold, an electronic control unit determines that the aqueous urea solution in an amount required for cooling of the valve cannot be supplied from the tank to the valve and executes a return control for returning the aqueous urea solution in the valve to the tank.

6 Claims, 7 Drawing Sheets

(51) Int. Cl.
*F01N 3/20* (2006.01)
*F01N 9/00* (2006.01)
(52) U.S. Cl.
CPC .. *F01N 2610/144* (2013.01); *F01N 2610/146* (2013.01); *F01N 2610/1406* (2013.01); *F01N 2610/1493* (2013.01); *F01N 2900/1808* (2013.01); *F01N 2900/1814* (2013.01); *F01N 2900/1822* (2013.01); *Y02T 10/24* (2013.01); *Y02T 10/47* (2013.01)
(58) Field of Classification Search
CPC ....... F01N 2610/1406; F01N 2610/144; F01N 2610/146; F01N 2610/1493; F01N 2900/1808; F01N 2900/1814; F01N 2900/1822; F01N 3/208; F01N 9/00; Y02T 10/24; Y02T 10/47
USPC .................................. 60/286, 295, 301, 303
See application file for complete search history.

(56) References Cited

FOREIGN PATENT DOCUMENTS

| | | | |
|---|---|---|---|
| JP | 2003-293736 | A | 10/2003 |
| JP | 2008-069731 | A | 3/2008 |
| JP | 2010-096126 | A | 4/2010 |
| JP | 2014-009661 | A | 1/2014 |
| JP | 2014-222064 | A | 11/2014 |
| JP | 2015-075003 | A | 4/2015 |

\* cited by examiner

AQUEOUS UREA SOLUTION SUPPLY DEVICE AND AQUEOUS UREA SOLUTION SUPPLY METHOD FOR INTERNAL COMBUSTION ENGINE

INCORPORATION BY REFERENCE

The disclosure of Japanese Patent Application No. 2015-107571 filed on May 27, 2015 including the specification, drawings and abstract is incorporated herein by reference in its entirety.

BACKGROUND OF THE INVENTION

1. Field of the Invention

The invention relates to an aqueous urea solution supply device and an aqueous urea solution supply method for an internal combustion engine.

2. Description of Related Art

Purification method using aqueous urea solution is known as an example of a method for removing NOx that is contained in exhaust gas of an internal combustion engine. In the internal combustion engine that adopts this purification method, the aqueous urea solution is stored in a tank and a urea adding valve that injects the aqueous urea solution is disposed on an exhaust passage. The aqueous urea solution that is stored in the tank is pressure-fed to the urea adding valve by a pump, and the aqueous urea solution is added from the urea adding valve toward the exhaust gas. The aqueous urea solution added to the exhaust gas is hydrolyzed by heat of the exhaust gas, and then ammonia is generated. The generated ammonia is adsorbed onto a NOx removal catalyst disposed in the exhaust passage and is used when the NOx is removed by reduction.

In some cases, the temperature of the aqueous urea solution in the urea adding valve is raised by the temperature of the urea adding valve being raised with the urea adding valve being exposed to the exhaust gas. Then, the urea adding valve might corrode due to the aqueous urea solution with an elevated temperature. Japanese Patent Application Publication No. 2014-222064 discloses a device that performs a cooling addition (protective injection) for adding the aqueous urea solution to the exhaust gas such that the urea adding valve is cooled. When the aqueous urea solution is added from the urea adding valve to the exhaust gas by this cooling addition, aqueous urea solution with a relatively low temperature flows into the urea adding valve from the tank, and thus the urea adding valve is cooled.

SUMMARY OF THE INVENTION

When the aqueous urea solution in an addition amount required for the cooling of the urea adding valve cannot be supplied from the tank to the urea adding valve, the previously added aqueous urea solution remains in the urea adding valve. Accordingly, the temperature of the remaining aqueous urea solution is raised by an increase in the temperature of the urea adding valve that is attributable to the exhaust gas, and then the urea adding valve may be corrode.

The invention provides an aqueous urea solution supply device and an aqueous urea solution supply method for an internal combustion engine that is capable of suppressing the corrosion of a urea adding valve which is attributable to aqueous urea solution.

A first aspect of the invention provides an aqueous urea solution supply device for an internal combustion engine, the internal combustion engine includes an exhaust passage. The aqueous urea solution supply device includes: a tank that stores aqueous urea solution; an urea adding valve disposed on the exhaust passage, the urea adding valve is configured to add the aqueous urea solution to exhaust gas of the internal combustion engine; an aqueous urea solution passage configured to supply the aqueous urea solution in the tank to the urea adding valve; a pump disposed on the aqueous urea solution passage; and an electronic control unit. The electronic control unit is configured to execute a return control, the return control is a control for returning the aqueous urea solution in the urea adding valve to the tank when the electronic control unit determines that the aqueous urea solution in an addition amount required for cooling of the urea adding valve is not supplied from the tank to the urea adding valve.

According to the configuration described above, the aqueous urea solution in the urea adding valve returns to the tank when the aqueous urea solution in the addition amount required for the cooling of the urea adding valve cannot be supplied from the tank to the urea adding valve. Accordingly, the aqueous urea solution can be inhibited from remaining in the urea adding valve in the event of a state where a sufficient effect of the cooling of the urea adding valve by urea addition is not achieved. Hence, corrosion of the urea adding valve attributable to the aqueous urea solution can be suppressed.

The aqueous urea solution supply device may further includes a pressure detection device configured to detect a pressure of the aqueous urea solution supplied to the urea adding valve, and a water quantity detection device configured to detect an aqueous urea solution amount in the tank. The electronic control unit may be configured to determine that the aqueous urea solution in the addition amount required for the cooling of the urea adding valve is not supplied from the tank to the urea adding valve when the pressure of the aqueous urea solution detected by the pressure detection device is equal to or lower than a predetermined pressure and the aqueous urea solution amount detected by the water quantity detection device is equal to or smaller than a predetermined threshold.

When the aqueous urea solution amount in the tank decreases, a liquid surface of the aqueous urea solution approaches a suction port of the pump, and thus the pump becomes increasingly likely to be mixed with air. When the pump is mixed with the air, the pressure of the aqueous urea solution that is supplied to the urea adding valve declines. According to the configuration described above, it is determined that the current state is the state where the aqueous urea solution in the addition amount required for the cooling of the urea adding valve cannot be supplied from the tank to the urea adding valve when the pressure of the aqueous urea solution supplied to the urea adding valve is equal to or lower than the predetermined pressure and the aqueous urea solution amount in the tank is equal to or smaller than the predetermined threshold. Accordingly, it can be appropriately determined that the current state is the state where the aqueous urea solution equivalent in the addition amount required for the cooling of the urea adding valve cannot be supplied from the tank to the urea adding valve.

The liquid surface of the aqueous urea solution approaches the suction port of the pump, even if the aqueous urea solution amount in the tank is a sufficient amount, when a height of the liquid surface in the vicinity of the suction port of the pump is decreased by an inclination of the liquid surface of the aqueous urea solution. In this case, the mixing of the pump with the air becomes increasingly likely to occur, and the aqueous urea solution in the addition amount required for the cooling of the urea adding valve cannot be supplied from the tank to the urea adding valve when the pump is actually mixed with the air. The aqueous urea solution supply device may further includes an inclination detection unit configured to detect an inclination of a liquid surface of the aqueous urea solution in the tank. The electronic control unit may be configured to correct the aqueous urea solution amount detected by the water quantity detection device based on the inclination of the liquid surface detected by the inclination detection unit.

According to the configuration described above, the aqueous urea solution amount is corrected based on the inclination of the liquid surface, and thus it can be accurately determined whether or not the current state is the state where the aqueous urea solution in the addition amount required for the cooling of the urea adding valve cannot be supplied from the tank to the urea adding valve.

The aqueous urea solution in the tank freezes at an extremely low temperature, and thus it is preferable that a heater is disposed to heat and thaw the aqueous urea solution in the tank. In a state where the aqueous urea solution is frozen and the aqueous urea solution is not entirely thawed, the amount of the aqueous urea solution that can be supplied to the urea adding valve is small even if the amount of the aqueous urea solution in the tank is a sufficient amount. Accordingly, when the urea addition for cooling continues, the liquid surface of the aqueous urea solution that is thawed approaches the suction port of the pump, and thus the mixing of the pump with the air becomes increasingly likely to occur, and the aqueous urea solution in the addition amount required for the cooling of the urea adding valve cannot be supplied from the tank to the urea adding valve when the pump is actually mixed with the air. The amount of the aqueous urea solution that is thawed by the heater increases in proportion to the length of a thawing time of the aqueous urea solution thawed by the heater. The aqueous urea solution may further includes a heater configured to heat and thaw the aqueous urea solution in the tank. The electronic control unit may be configured to measure a thawing time of the aqueous urea solution thawed by the heater, and the electronic control unit may be configured to correct the aqueous urea solution amount detected by the water quantity detection device based on the thawing time.

According to the configuration described above, the aqueous urea solution amount is corrected based on the thawing time that is proportional to the amount of the thawed aqueous urea solution, and thus it can be accurately determined whether or not the current state is the state where the aqueous urea solution in the addition amount required for the cooling of the urea adding valve cannot be supplied from the tank to the urea adding valve.

When the pressure of the aqueous urea solution supplied to the adding valve is lowered, a boost control for increasing the pressure of the aqueous urea solution by increasing a rotation speed of the pump is performed. Then, the lowered aqueous urea solution pressure can be recovered. Once the amount of the aqueous urea solution in the tank is decreased to the point of the pump suctioning air, the aqueous urea solution pressure cannot be recovered even when the boost control is repeatedly performed. Accordingly, whether or not the current state is the state where the aqueous urea solution in the addition amount required for the cooling of the urea adding valve cannot be supplied from the tank to the urea adding valve can also be determined based on how many times the boost control is executed.

The aqueous urea solution supply device may further includes a pressure detection device configured to detect a pressure of the aqueous urea solution supplied to the urea adding valve. The electronic control unit may be configured to repeatedly execute a boost control when the pressure of the aqueous urea solution detected by the pressure detection device is equal to or lower than a first predetermined pressure, the boost control being a control for increasing the pressure of the aqueous urea solution by increasing a rotation speed of the pump. The electronic control unit may be configured to determine that the aqueous urea solution in the addition amount required for the cooling of the urea adding valve is not supplied from the tank to the urea adding valve when the number of executions of the boost control exceeds the number of predetermined times and the pressure of the aqueous urea solution has yet to reach a second predetermined pressure. The second predetermined pressure may be higher than the first predetermined pressure.

According to the configuration described above, it can be appropriately determined, without the aqueous urea solution amount in the tank being referred to, that the current state is the state where the aqueous urea solution in the addition amount required for the cooling of the urea adding valve cannot be supplied from the tank to the urea adding valve. In addition, since the aqueous urea solution amount in the tank is not referred to, it can be accurately determined, even without the inclination of the liquid surface of the aqueous urea solution and a thawing amount of the aqueous urea solution in the tank being taken into account, whether or not the current state is the state where the aqueous urea solution in the addition amount required for the cooling of the urea adding valve cannot be supplied from the tank to the urea adding valve.

A second aspect of the invention provides a aqueous urea solution supply method for an internal combustion engine. The internal combustion engine includes an exhaust passage, a tank, a urea adding valve, a aqueous urea solution passage, and a pump. The tank stores aqueous urea solution. The urea adding valve is disposed on the exhaust passage. The urea adding valve is configured to add the aqueous urea solution to exhaust gas of the internal combustion engine. The aqueous urea solution passage is configured to supply the aqueous urea solution in the tank to the urea adding valve. The pump is disposed on the aqueous urea solution passage. The aqueous urea solution supply method comprising: returning the aqueous urea solution in the urea adding valve to the tank when an electronic control unit determines that the aqueous urea solution in an addition amount required for cooling of the urea adding valve is not supplied from the tank to the urea adding valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a specific first embodiment of an aqueous urea solution supply device for an internal combustion engine will be described with reference to FIGS. 1 to 4.

Figure 1:
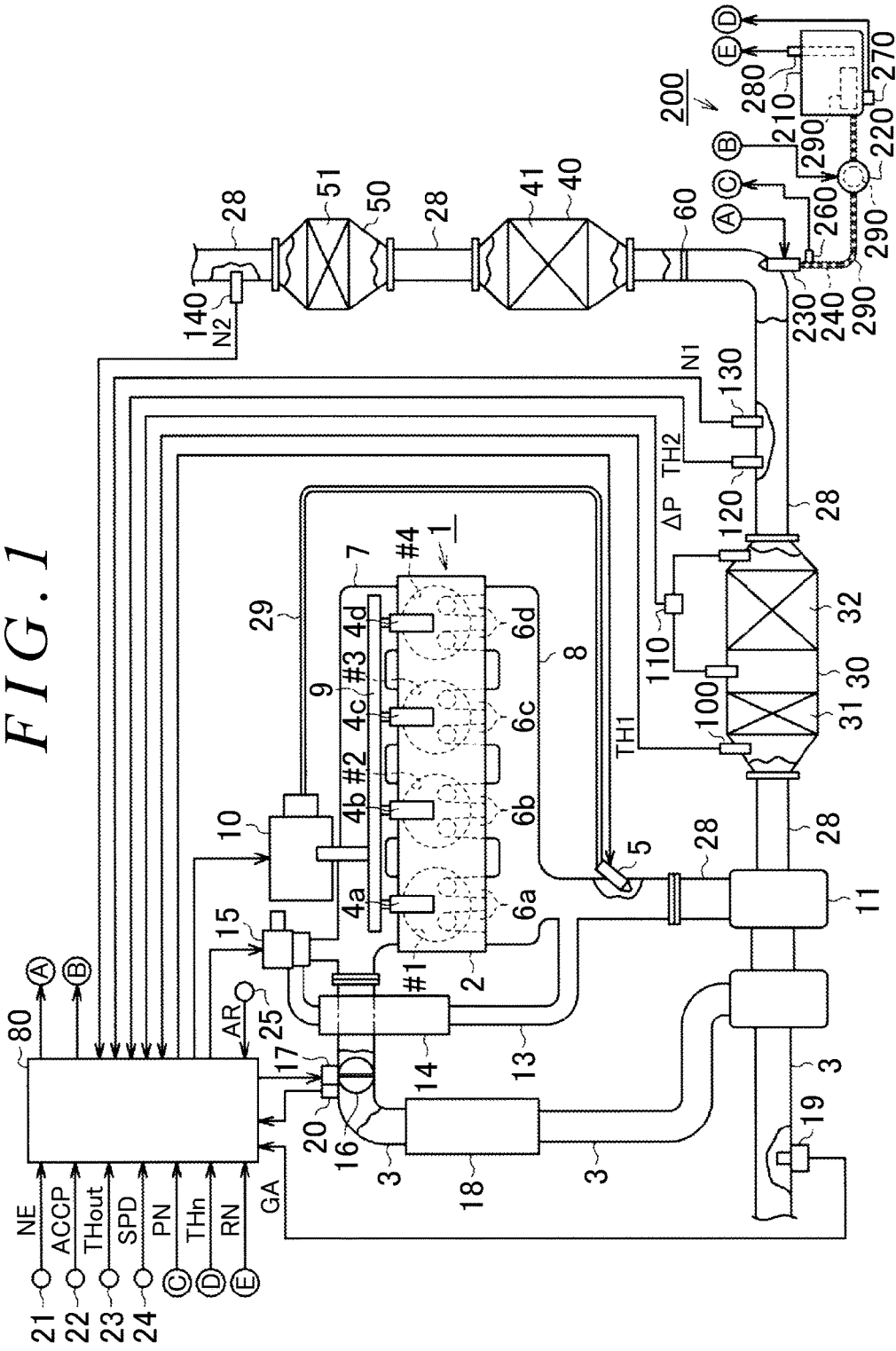
FIG. 1 is a schematic diagram illustrating a configuration of an internal combustion engine that is provided with an aqueous urea solution supply device according to a first embodiment.

A configuration of an internal combustion engine 1 to which the aqueous urea solution supply device is applied is illustrated in FIG. 1. The internal combustion engine 1 according to this embodiment is a diesel engine. The internal combustion engine 1 according to this embodiment is mounted in a vehicle. A plurality of cylinders #1 to #4 are disposed in the internal combustion engine 1. A plurality of fuel injection valves 4a to 4d are attached to a cylinder head 2 to correspond to the respective cylinders #1 to #4. These fuel injection valves 4a to 4d inject a fuel into combustion chambers of the respective cylinders #1 to #4. An intake port for introducing fresh air into the cylinders and exhaust ports 6a to 6d for discharging combustion gas out of the cylinders are disposed in the cylinder head 2 to correspond to the respective cylinders #1 to #4.

The fuel injection valves 4a to 4d are connected to a common rail 9 that accumulates a high-pressure fuel. The common rail 9 is connected to a supply pump 10. The supply pump 10 suctions the fuel in a fuel tank and supplies the high-pressure fuel to the common rail 9. When the fuel injection valves 4a to 4d are open, the high-pressure fuel supplied to the common rail 9 is injected into the cylinders from the respective fuel injection valves 4a to 4d.

An intake manifold 7 is connected to the intake port. The intake manifold 7 is connected to an intake passage 3. An intake throttle valve 16 for suctioned air amount adjustment is disposed in the intake passage 3.

An exhaust manifold 8 is connected to the exhaust ports 6a to 6d. The exhaust manifold 8 is connected to an exhaust passage 28. A turbocharger 11, which supercharges suctioned air introduced into the cylinders by using an exhaust gas pressure, is disposed in the middle of the exhaust passage 28. On the intake passage 3, an intercooler 18 is disposed between an intake side compressor of the turbocharger 11 and the intake throttle valve 16. The intercooler 18 cools the suctioned air with a temperature raised by the supercharging by the turbocharger 11.

A first purification member 30 that purifies exhaust gas is disposed on the downstream side of an exhaust side turbine of the turbocharger 11 and in the middle of the exhaust passage 28. In the first purification member 30, an oxidation catalyst 31 and a filter 32 are arranged in series with respect to a direction in which the exhaust gas flows.

A catalyst that performs an oxidation treatment on HC in the exhaust gas is supported on the oxidation catalyst 31. The filter 32 is a member that collects particulate matter (PM) in the exhaust gas and is configured to use porous ceramic. A catalyst that promotes PM oxidation is supported on the filter 32. The PM in the exhaust gas is collected when the exhaust gas passes through a porous wall of the filter 32.

A fuel adding valve 5 for supplying the fuel as an additive to the oxidation catalyst 31 and the filter 32 is disposed in the vicinity of a merging portion of the exhaust manifold 8. The fuel adding valve 5 is connected to the supply pump 10 via a fuel supply pipe 29. A position at which the fuel adding valve 5 is arranged can be appropriately changed insofar as the position is on the upstream side of the first purification member 30 in an exhaust system. The fuel as the additive may be supplied to the oxidation catalyst 31 and the filter 32 by a post injection being performed with a fuel injection timing adjusted.

When the amount of the PM collected by the filter 32 exceeds a predetermined value, a regeneration processing for the filter 32 is initiated. During the regeneration processing for the filter 32, the fuel is injected into the exhaust manifold 8 from the fuel adding valve 5. The fuel that is injected from the fuel adding valve 5 is burned upon reaching the oxidation catalyst 31. Then, the temperature of the exhaust gas rises. Then, the temperature of the filter 32 rises by the exhaust gas heated at the oxidation catalyst 31 flowing into the filter 32. In this manner, the filter 32 is regenerated by the PM deposited in the filter 32 being subjected to an oxidation treatment.

A second purification member 40 that purifies the exhaust gas is disposed on the downstream side of the first purification member 30 and in the middle of the exhaust passage 28. A selective reduction-type NOx catalyst (hereinafter, referred to as a SCR catalyst) 41 as a catalyst that converts NOx in the exhaust gas is arranged in the second purification member 40.

A third purification member 50 that purifies the exhaust gas is disposed on the downstream side of the second purification member 40 and in the middle of the exhaust passage 28. An ammonia oxidation catalyst 51 that converts ammonia in the exhaust gas is arranged in the third purification member 50.

A aqueous urea solution supply device 200 that adds aqueous urea solution to the exhaust gas is disposed in the internal combustion engine 1. The aqueous urea solution supply device 200 is provided with a tank 210 that stores the aqueous urea solution, a urea adding valve 230 that supplies the aqueous urea solution into the exhaust passage 28 by injection, a aqueous urea solution passage 240 that connects the urea adding valve 230 and the tank 210 to each other, an electric pump 220 that is disposed in the middle of the aqueous urea solution passage 240, and the like.

A heater for thawing the frozen aqueous urea solution or inhibiting the aqueous urea solution from freezing is disposed in the aqueous urea solution supply device 200. For example, in this embodiment, an electrical heater 290 is disposed in each of the tank 210, the aqueous urea solution passage 240, and the pump 220.

The urea adding valve 230 is disposed between the first purification member 30 and the second purification member 40 on the exhaust passage 28. The urea adding valve 230 has an injection hole directed toward the SCR catalyst 41. When the urea adding valve 230 is open, the aqueous urea solution is supplied by injection into the exhaust passage 28 via the aqueous urea solution passage 240.

A dispersion plate 60 is disposed between the urea adding valve 230 and the SCR catalyst 41 in the exhaust passage 28. The dispersion plate 60 promotes the atomization of the aqueous urea solution by dispersing the aqueous urea solution injected from the urea adding valve 230 on the upstream side of the SCR catalyst 41.

The aqueous urea solution injected from the urea adding valve 230 turns into ammonia after being hydrolyzed by heat of the exhaust gas. This ammonia is adsorbed onto the SCR catalyst 41. Then, NOx reduction purification is carried out by the ammonia adsorbed on the SCR catalyst 41.

The internal combustion engine 1 is provided with an exhaust gas recirculation device (hereinafter, referred to as an EGR device), too. This EGR device is a device that reduces a NOx generation amount by introducing some of the exhaust gas into the suctioned air and lowering a combustion temperature in the cylinder. An EGR passage 13, an EGR valve 15, an EGR cooler 14, and the like constitute the EGR device. The EGR passage 13 allows the intake passage 3 and the exhaust manifold 8 to communicate with each other. The EGR valve 15 is disposed on the EGR passage 13. The amount of recirculation of the exhaust gas that is introduced into the intake passage 3 from the exhaust passage 28, that is, an EGR amount, is adjusted by an opening degree of the EGR valve 15 being adjusted. The temperature of the exhaust gas that flows through the EGR passage 13 is lowered by the EGR cooler 14.

Various sensors for engine operation state detection are attached to the internal combustion engine 1. For example, an air flow meter 19 detects a suctioned air amount GA. A throttle valve opening degree sensor 20 detects an opening degree of the intake throttle valve 16. A crank angle sensor 21 detects an engine rotation speed NE. An accelerator sensor 22 detects an accelerator operation amount ACCP that is an accelerator pedal depression amount. An outside air temperature sensor 23 detects an outside air temperature THout. A vehicle speed sensor 24 detects a vehicle speed SPD that is a traveling speed of the vehicle in which the internal combustion engine 1 is mounted. An inclination angle sensor 25 is a sensor that detects an inclination angle AR of the vehicle. The inclination angle AR represents an inclination of a liquid surface of the aqueous urea solution in the tank 210 with respect to a horizontal plane. A pressure sensor 260 as a pressure detection device that is disposed on the aqueous urea solution passage 240 in the vicinity of the urea adding valve 230 detects a aqueous urea solution pressure PN which is the pressure of the aqueous urea solution supplied to the urea adding valve 230. A temperature sensor 270 that is disposed on the tank 210 detects a aqueous urea solution temperature THn which is the temperature of the aqueous urea solution in the tank 210. A level sensor 280 as a water quantity detection device that is disposed in the tank 210 detects a aqueous urea solution amount RN which is the amount of the aqueous urea solution stored in the tank 210.

A first exhaust gas temperature sensor 100 that is disposed on the upstream side of the oxidation catalyst 31 detects a first exhaust gas temperature TH1, which is the temperature of the exhaust gas that has yet to flow into the oxidation catalyst 31. A differential pressure sensor 110 detects a differential pressure ΔP that is a pressure difference between the exhaust gas pressure on the upstream side of the filter 32 and the exhaust gas pressure on the downstream side of the filter 32. On the exhaust passage 28, a second exhaust gas temperature sensor 120 and a first NOx sensor 130 are disposed on the upstream side of the urea adding valve 230 and between the first purification member 30 and the second purification member 40. The second exhaust gas temperature sensor 120 detects a second exhaust gas temperature TH2, which is the temperature of the exhaust gas that has yet to flow into the SCR catalyst 41. The first NOx sensor 130 detects a first NOx concentration N1, which is a NOx concentration of the exhaust gas that has yet to flow into the SCR catalyst 41, that is, a NOx concentration of the exhaust gas that has yet to be purified by the SCR catalyst 41. The first NOx concentration N1 can be estimated based on various engine operation state-related values such as the amount of the fuel injected from the fuel injection valves 4a to 4d, the fuel injection timing, the engine rotation speed, and the suctioned air amount GA associated with an air-fuel ratio.

On the exhaust passage 28, a second NOx sensor 140 is disposed on the downstream side of the third purification member 50. The second NOx sensor 140 detects a second NOx concentration N2, which is the NOx concentration of the exhaust gas purified by the SCR catalyst 41. Outputs from these various sensors and the like are input to an electronic control unit 80. This electronic control unit 80 is configured to have a microcomputer as a main component. The microcomputer is provided with a central processing unit (CPU), a read-only memory (ROM) in which various programs, maps, and the like are stored in advance, a random access memory (RAM) that temporarily stores a calculation result of the CPU and the like, a timer counter, an input interface, an output interface, and the like.

The electronic control unit 80 is configured to perform various types of controls for the internal combustion engine 1 such as fuel injection controls for the fuel injection valves 4a to 4d and the fuel adding valve 5, a discharge pressure control for the supply pump 10, a driving amount control for an actuator 17 that opens and closes the intake throttle valve 16, and an opening degree control for the EGR valve 15. Various exhaust gas purification controls such as the above-described regeneration processing for the combustion of the PM collected by the filter 32 are performed by the electronic control unit 80, too.

The electronic control unit 80 controls aqueous urea solution addition by the urea adding valve 230 as an example of the exhaust gas purification control. During this addition control, a urea addition amount QE that is required for a reduction treatment of the NOx discharged from the internal combustion engine 1 is calculated based on the engine operation state and the like. Then, an opening state of the urea adding valve 230 is controlled such that urea equivalent in amount to the calculated urea addition amount QE is injected from the urea adding valve 230.

A tip of the urea adding valve 230 is exposed to the exhaust gas, and thus is subjected to a thermal damage in some cases. When the aqueous urea solution is injected from the urea adding valve 230, the aqueous urea solution with a relatively low temperature flows into the urea adding valve 230 from the tank 210, and thus the urea adding valve 230 is cooled. In this regard, the electronic control unit 80 performs a cooling addition for cooling the urea adding valve 230 by injecting the aqueous urea solution from the urea adding valve 230. During the cooling addition, a cooling addition amount QEC that is an addition amount of the aqueous urea solution which is required for the cooling addition is calculated based on the exhaust gas temperature (such as the second exhaust gas temperature TH2), an exhaust gas flow rate, the vehicle speed SPD, the aqueous urea solution temperature THn, and the like. The exhaust gas flow rate is an estimated value that is calculated based on, for example, the suctioned air amount GA and the engine rotation speed. The vehicle speed SPD is related to an effect of the cooling of the urea adding valve 230 by traveling wind. In a case where the urea addition amount QE for NOx removal exceeds the cooling addition amount QEC, the opening state of the urea adding valve 230 is controlled such that the aqueous urea solution equivalent in amount to the urea addition amount QE is injected from the urea adding valve 230. In a case where the urea addition amount QE for NOx removal is equal to or smaller than the cooling addition amount QEC, the opening state of the urea adding valve 230 is controlled such that the aqueous urea solution equivalent in amount to the cooling addition amount QEC is injected from the urea adding valve 230.

The urea addition is stopped once the engine stops operating. However, when the aqueous urea solution remains in the urea adding valve 230 and the aqueous urea solution passage 240 and the outside air temperature is low, for example, the remaining aqueous urea solution freezes and expands in some cases. In this regard, the electronic control unit 80 performs a return control, which is to return the aqueous urea solution in the urea adding valve 230 and the aqueous urea solution passage 240 to the tank 210 after the engine is stopped, so as to prevent the urea adding valve 230 and the aqueous urea solution passage 240 from being damaged by the freezing and expansion of the aqueous urea solution. During the return control, the pump 220 is driven in the direction opposite to that at a time of the urea addition during the operation of the engine and the opening state of the urea adding valve 230 is maintained. The aqueous urea solution with which the urea adding valve 230 and the aqueous urea solution passage 240 are filled returns to the tank 210 by these reverse-rotation driving of the pump 220 and maintenance of the opening state of the urea adding valve 230 being executed for a predetermined period of time.

After this return control is performed after the engine is stopped, the urea adding valve 230 and the aqueous urea solution passage 240 need to be filled with the aqueous urea solution when urea addition is initiated during the next start of the engine. In this regard, the electronic control unit 80 performs a filling control, which is to drive the pump 220 by positive rotation and drive the urea adding valve 230 to be opened or closed such that the urea adding valve 230 and the aqueous urea solution passage 240 are filled with the aqueous urea solution, before the urea addition for NOx removal is initiated after the engine is started. Once the filling control is completed, the electronic control unit 80 executes a boost control for raising the aqueous urea solution pressure PN to a pressure close to a specified pressure. During the boost control, the electronic control unit 80 maintains a state where the urea adding valve 230 is closed and executes a processing for increasing a rotation speed of the pump 220 driven by the positive rotation to a predetermined speed for a predetermined period of time. Once the boost control is completed, the electronic control unit 80 initiates a constant pressure control for causing the rotation speed of the pump 220 to be subjected to a feedback control such that the aqueous urea solution pressure PN is maintained at the specified pressure. Once the constant pressure control is initiated, a aqueous urea solution addition preparation is completed.

In a case where the aqueous urea solution temperature THn is lower than a predetermined temperature, the electronic control unit 80 determines that the aqueous urea solution in the tank 210 is highly likely to be frozen and performs the thawing of the aqueous urea solution by energizing the heater 290. Then, in a case where the aqueous urea solution temperature THn reaches at least the predetermined temperature, the electronic control unit 80 determines that the thawing of the aqueous urea solution is completed and stops the energization of the heater 290.

In a state where the aqueous urea solution equivalent in amount to the cooling addition amount QEC that is required for the execution of the above-described cooling addition cannot be supplied from the tank 210 to the urea adding valve 230, the aqueous urea solution added until then remains in the urea adding valve 230. Accordingly, the temperature of the remaining aqueous urea solution is raised by the exhaust gas, and then the urea adding valve 230 might be corroded.

Figure 2:
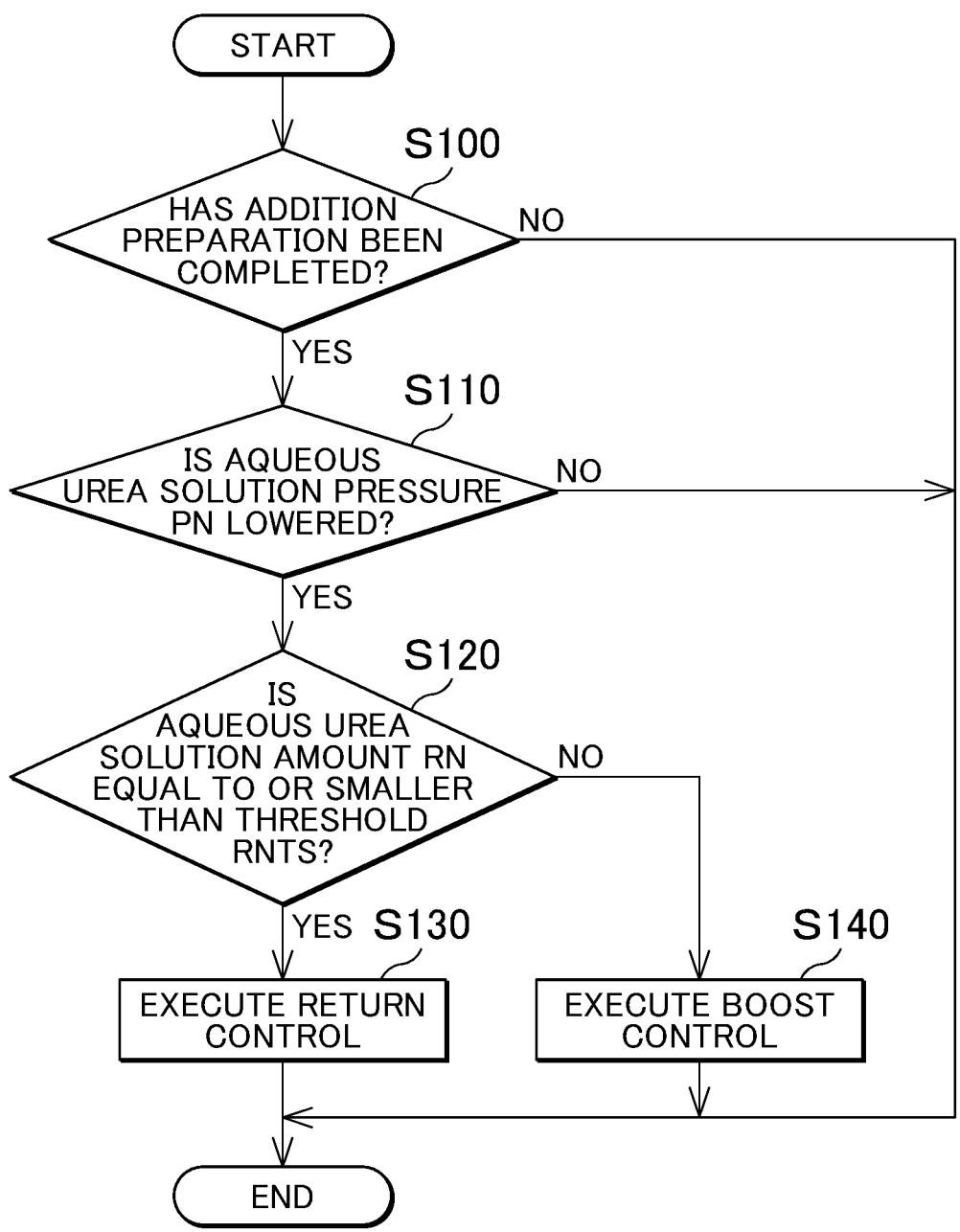
FIG. 2 is a flowchart illustrating a procedure of a corrosion inhibition processing according to the first embodiment.

The electronic control unit 80 executes a corrosion inhibition processing that is illustrated in FIG. 2 at a predetermined cycle so as to suppress the corrosion of the urea adding valve 230 which is attributable to the aqueous urea solution. As illustrated in FIG. 2, once this processing is started, it is determined whether or not the addition preparation has been completed (S100). In this Step S100, it is determined that the addition preparation has been completed when the filling control and the boost control have been completed as described above and the constant pressure control has been initiated. When the addition preparation has yet to be completed (S100: NO), this processing is terminated.

When the addition preparation has been completed (S100: YES), it is determined whether or not the aqueous urea solution pressure PN is lowered (S110). In this Step S110, it is determined that the aqueous urea solution pressure PN is lowered when the aqueous urea solution pressure PN is equal to or lower than a predetermined pressure PNTS. A pressure that is sufficiently lower than the specified pressure described above is set in advance to the predetermined pressure PNTS. Preferably, in Step S110, it is determined that the aqueous urea solution pressure PN is lowered when a state where the aqueous urea solution pressure PN is equal to or lower than the predetermined pressure PNTS continues for at least a specified period TT so that it is determined that the state where the aqueous urea solution pressure PN is equal to or lower than the predetermined pressure PNTS is not an unexpected state but a state continuing to some extent. A length of time that is suitable for the determination that the state where the aqueous urea solution pressure PN is equal to or lower than the predetermined pressure PNTS is not an unexpected state but a state continuing to some extent may be set in advance to the specified period TT. When it is determined that the aqueous urea solution pressure PN is not lowered (S110: NO), this processing is terminated.

When it is determined that the aqueous urea solution pressure PN is lowered (S110: YES), it is determined whether or not the aqueous urea solution amount RN in the tank 210 is equal to or smaller than a threshold RNTS (S120). The magnitude of the value of the threshold RNTS is set such that it can be accurately determined, based on the aqueous urea solution amount RN being equal to or smaller than this threshold RNTS, that the current aqueous urea solution amount RN is in a state where the aqueous urea solution in the addition amount required for the cooling of the urea adding valve 230 cannot be supplied from the tank 210 to the urea adding valve 230.

When the aqueous urea solution amount RN is equal to or smaller than the threshold RNTS (S120: YES), the return control is executed (S130) and this processing is terminated. The return control in this Step S120 is the same control as the return control described above. In other words, the pump 220 is driven in the direction opposite to that at a time of the urea addition during the operation of the engine and the opening state of the urea adding valve 230 is maintained. The aqueous urea solution remaining in the urea adding valve 230 and the aqueous urea solution remaining in the aqueous urea solution passage 240 return to the tank 210 by these reverse-rotation driving of the pump 220 and maintenance of the opening state of the urea adding valve 230 being executed for a period of predetermined time.

When the aqueous urea solution amount RN exceeds the threshold RNTS (S120: NO), the boost control is executed (S140) and this processing is terminated. The boost control in this Step S140 is the same as the boost control described above. In other words, the lowered aqueous urea solution pressure PN is raised to the pressure close to the specified pressure described above by the state where the urea adding valve 230 is closed being maintained and the processing for increasing the pump rotation speed to the predetermined speed in the state where the pump 220 is driven by the positive rotation being executed for the predetermined period of time. Once this boost control is completed, the constant pressure control described above is initiated.

Figure 3:
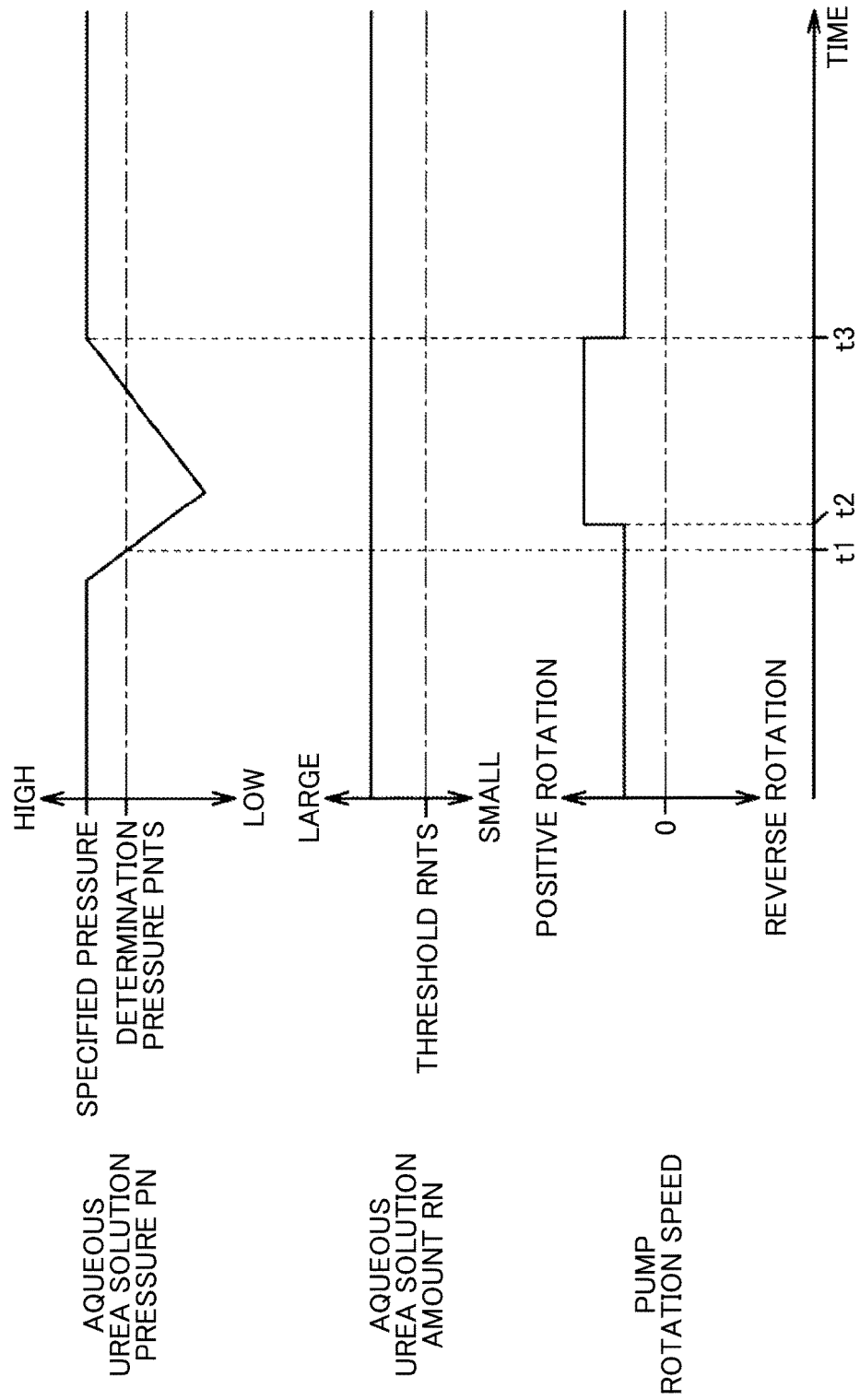
FIG. 3 is a timing chart showing an effect of the corrosion inhibition processing.

Hereinafter, an effect that is achieved by the execution of the corrosion inhibition processing will be described. As illustrated in FIG. 3, the aqueous urea solution pressure PN maintained at the specified pressure begins to be lowered as the pump 220 is mixed with air, and then the aqueous urea solution pressure PN becomes equal to or lower than the predetermined pressure PNTS at time t1. Then, once the state where the aqueous urea solution pressure PN is equal to or lower than the predetermined pressure PNTS continues for at least the specified period TT (time t2), it is determined whether or not the aqueous urea solution amount RN at that point in time is equal to or smaller than the threshold RNTS. When the aqueous urea solution amount RN exceeds the threshold RNTS, the pump rotation speed is increased to the predetermined speed by the boost control being executed. After the boost control is executed for a predetermined period of time, the aqueous urea solution pressure PN is raised to the pressure close to the specified pressure (time t3).

As described above, in a case where the aqueous urea solution amount RN at the reduced aqueous urea solution pressure PN exceeds the threshold RNTS, the amount of the aqueous urea solution that is stored in the tank 210 is in a state of sufficient storage to the point of allowing the aqueous urea solution in the addition amount required for the cooling of the urea adding valve 230 to be supplied from the tank 210 to the urea adding valve 230. Accordingly, the decline in the aqueous urea solution pressure PN is temporary, and the aqueous urea solution pressure PN is recovered to the specified pressure described above by the boost control being performed.

Figure 4:
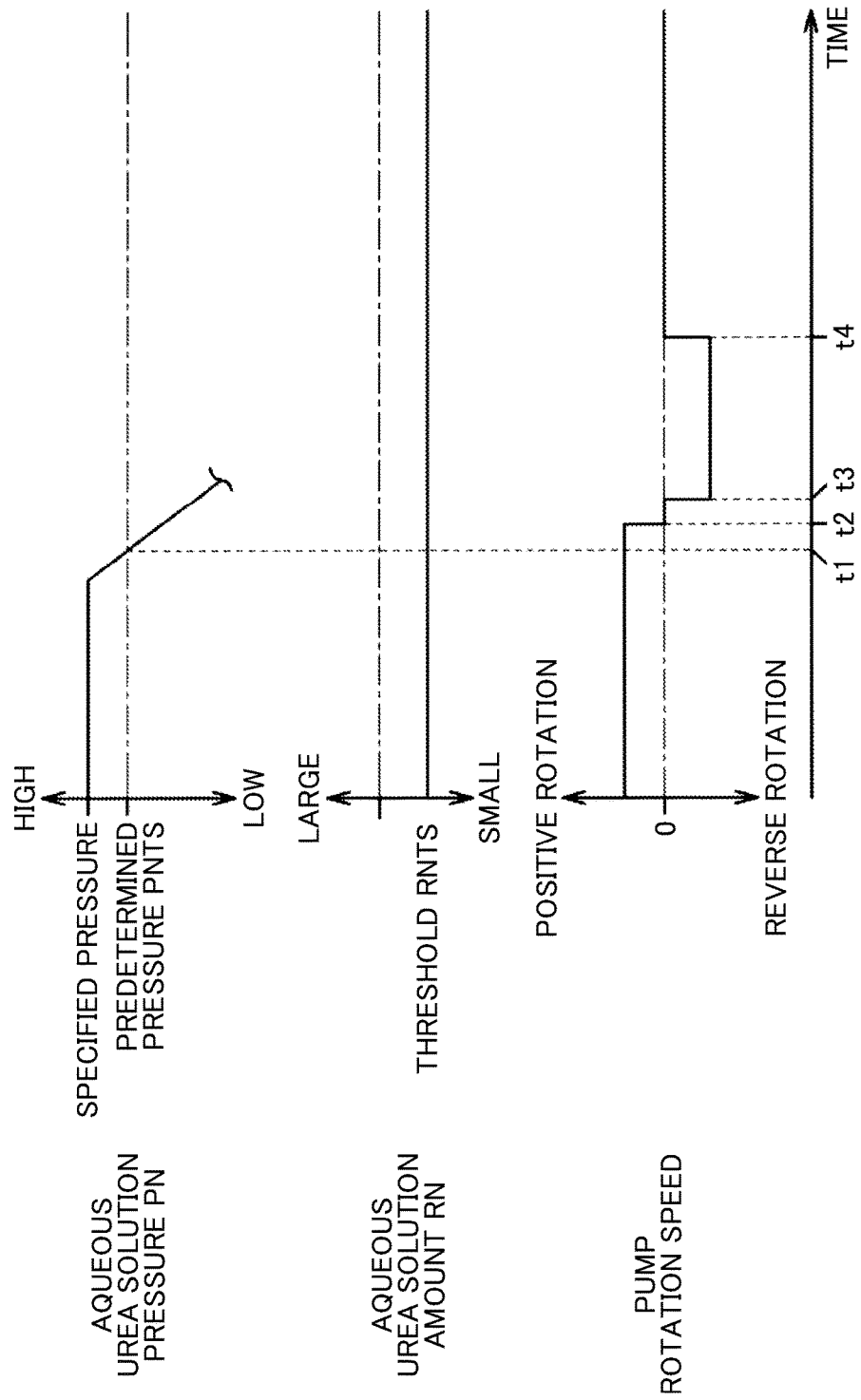
FIG. 4 is a timing chart showing the effect of the corrosion inhibition processing.

As illustrated in FIG. 4, the aqueous urea solution pressure PN maintained at the specified pressure begins to be lowered as the pump 220 is mixed with the air, and then the aqueous urea solution pressure PN becomes equal to or lower than the predetermined pressure PNTS at time t1. Then, once the state where the aqueous urea solution pressure PN is equal to or lower than the predetermined pressure PNTS continues for at least the specified period TT (time t2), it is determined whether or not the aqueous urea solution amount RN at that point in time is equal to or smaller than the threshold RNTS. When the aqueous urea solution amount RN is equal to or smaller than the threshold RNTS, the pump 220 subjected to the positive rotation is reversely rotated at a pump rotation speed determined in advance by the return control being executed (time t3). When the pump 220 subjected to the positive rotation is reversely rotated with rapidity, a large load is applied to the pump 220. Accordingly, it is preferable that the reverse rotation is initiated after the pump 220 subjected to the positive rotation is temporarily stopped. Then, after the execution of the return control for a predetermined period of time, the rotation of the pump 220 is stopped (time t4).

In a case where the aqueous urea solution pressure PN is lowered due to the mixing of the pump 220 with the air and the aqueous urea solution amount RN is equal to or smaller than the threshold RNTS as described above, the mixing of the pump 220 with the air is attributable to the shortage of the aqueous urea solution amount RN. The amount of the aqueous urea solution that is stored in the tank 210 is in the state of being insufficient to the point of the aqueous urea solution in the addition amount required for the cooling of the urea adding valve 230 not being capable of being supplied from the tank 210 to the urea adding valve 230. Accordingly, the return control is performed without the boost control being performed. In other words, the aqueous urea solution in the urea adding valve 230 returns to the tank 210 when the state is where the aqueous urea solution in the addition amount required for the cooling of the urea adding valve 230 cannot be supplied from the tank 210 to the urea adding valve 230 and the state is where a sufficient effect of the cooling of the urea adding valve 230 by the urea addition is not achieved. Accordingly, the aqueous urea solution can be inhibited from remaining in the urea adding valve 230. Hence, the occurrence of inconvenience in the form of the corrosion of the urea adding valve 230 that is attributable to the exhaust gas raising the temperature of the aqueous urea solution remaining in the urea adding valve 230 can be suppressed.

The following effects can be achieved by this embodiment described above.

(i) When it is determined that the aqueous urea solution in the addition amount required for the cooling of the urea adding valve 230 cannot be supplied from the tank 210 to the urea adding valve 230, the aqueous urea solution in the urea adding valve 230 is suctioned back to the tank 210. Accordingly, the aqueous urea solution can be inhibited from remaining in the urea adding valve 230 in the event of a state where the effect of the cooling of the urea adding valve 230 by the urea addition is not sufficiently achieved. Accordingly, the corrosion of the urea adding valve 230 that is attributable to the aqueous urea solution can be suppressed.

(ii) When the aqueous urea solution amount RN in the tank 210 decreases, the liquid surface of the aqueous urea solution approaches a suction port of the pump 220, and thus the mixing of the pump 220 with the air becomes increasingly likely to occur. Then, when the pump 220 is actually mixed with the air, the pressure of the aqueous urea solution that is supplied to the urea adding valve 230 declines. Then, the following determination is made when the aqueous urea solution amount RN in the tank 210 is equal to or smaller than the predetermined threshold RNTS (S120: YES) in a state where it can be determined that the aqueous urea solution pressure PN, which is the pressure of the aqueous urea solution supplied to the urea adding valve 230, is equal to or lower than the predetermined pressure PNTS and the mixing of the pump 220 with the air occurs (S110: YES). In other words, it is determined that the mixing of the pump 220 with the air is attributable to the shortage of the aqueous urea solution amount RN and the state arises where the aqueous urea solution in the addition amount required for the cooling of the urea adding valve 230 cannot be supplied from the tank 210 to the urea adding valve 230. Accordingly, the occurrence of the state where the aqueous urea solution in the addition amount required for the cooling of the urea adding valve 230 cannot be supplied from the tank 210 to the urea adding valve 230 can be appropriately determined.

Hereinafter, a specific second embodiment of the aqueous urea solution supply device for an internal combustion engine will be described with reference to FIG. 5.

The liquid surface of the aqueous urea solution approaches the suction port of the pump 220, even if the aqueous urea solution amount RN in the tank 210 is a sufficient amount, when the height of the liquid surface of the aqueous urea solution in the vicinity of the suction port of the pump 220 is decreased by an inclination of the liquid surface of the aqueous urea solution caused by an inclination of the vehicle. Accordingly, the mixing of the pump 220 with the air becomes increasingly likely to occur, and the aqueous urea solution in the addition amount required for the cooling of the urea adding valve 230 cannot be supplied from the tank 210 to the urea adding valve 230 when the pump 220 is actually mixed with the air.

The aqueous urea solution in the tank 210 freezes at an extremely low temperature, and thus the heater 290 is disposed to heat and thaw the aqueous urea solution in the tank 210. In a state where the aqueous urea solution is frozen and the aqueous urea solution is not entirely thawed, the amount of the aqueous urea solution that can be supplied to the urea adding valve 230 is small even if the amount of the aqueous urea solution in the tank 210 is a sufficient amount. Accordingly, when the cooling addition continues, the liquid surface of the aqueous urea solution that is thawed at a relatively early timing approaches the suction port of the pump 220. Accordingly, even in this case, the mixing of the pump 220 with the air becomes increasingly likely to occur, and it becomes difficult for the aqueous urea solution in the addition amount required for the cooling of the urea adding valve 230 to be supplied from the tank 210 to the urea adding valve 230 when the pump 220 is actually mixed with the air.

Because of this reason, it is preferable that the inclination of the liquid surface and a aqueous urea solution thawing amount are taken into account in a case where the aqueous urea solution amount RN is referred to during the determination of whether or not the aqueous urea solution in the addition amount required for the cooling of the urea adding valve 230 cannot be supplied from the tank 210 to the urea adding valve 230 in the current state. In a case where these points are taken into account, however, the aqueous urea solution amount RN needs to be corrected in accordance with the inclination of the liquid surface and the aqueous urea solution thawing amount, which results in an increase in control complexity. Then, inconvenience arises in the form of a number of man-hours for adaptation required for obtaining a correction value used for the correction.

When the pressure of the aqueous urea solution that is supplied to the urea adding valve 230 is lowered as described above, in contrast, the lowered aqueous urea solution pressure can be recovered by the boost control for increasing the aqueous urea solution pressure by the rotation speed of the pump 220 being increased being performed. Then, once the amount of the aqueous urea solution in the tank 210 is decreased to the point of the pump 220 suctioning air, the aqueous urea solution pressure cannot be recovered even when the boost control is repeatedly performed. Accordingly, whether or not the aqueous urea solution in the addition amount required for the cooling of the urea adding valve 230 cannot be supplied from the tank 210 to the urea adding valve 230 in the current state can be determined based on how many times the boost control is executed.

In this embodiment, the corrosion inhibition processing is performed by the use of how many times the boost control is executed instead of the aqueous urea solution amount RN. Hereinafter, a corrosion inhibition processing according to this embodiment will be described and the following description will focus on differences from the first embodiment.

Figure 5:
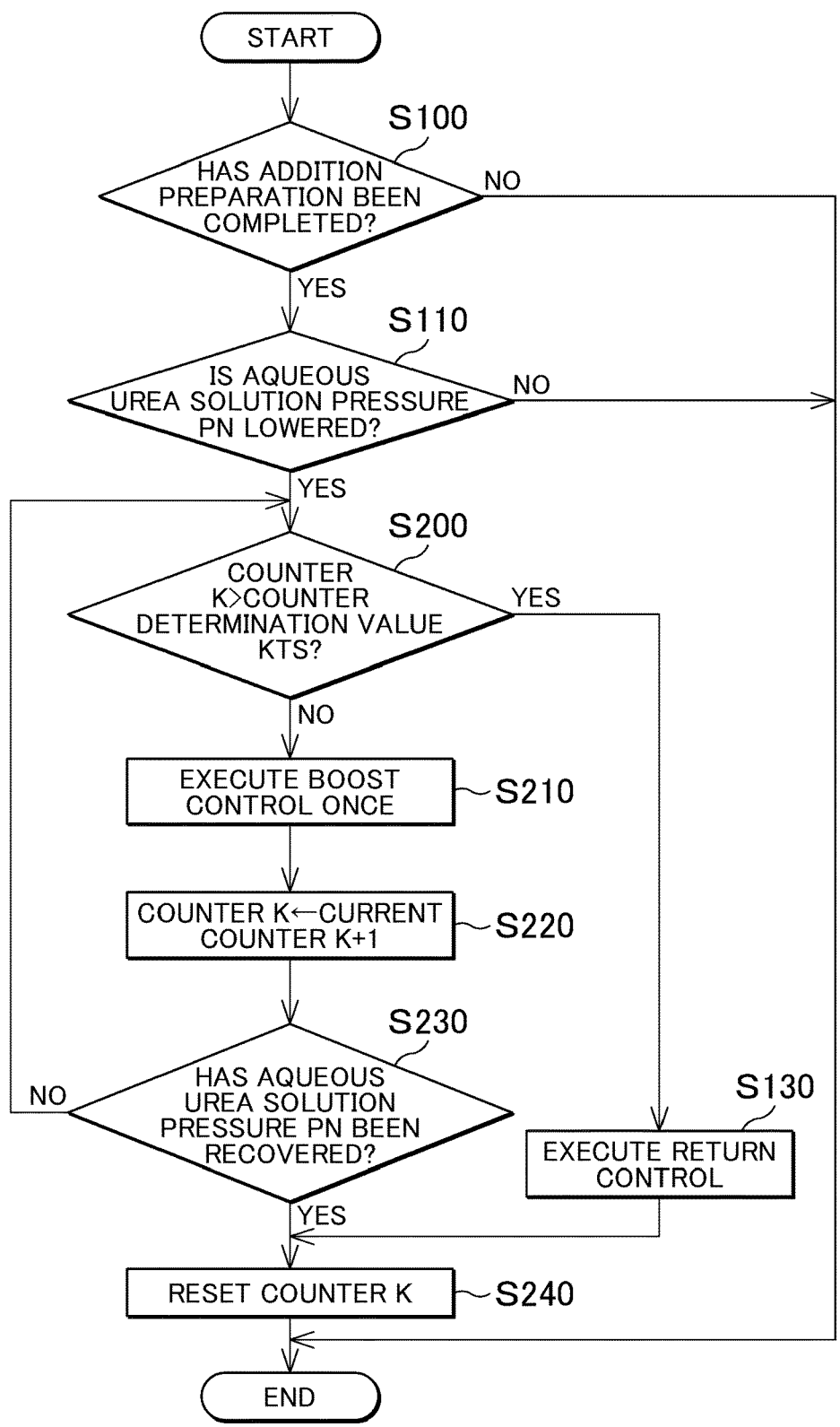
FIG. 5 is a flowchart illustrating a procedure of a corrosion inhibition processing according to a second embodiment.

A procedure of the corrosion inhibition processing according to this embodiment is illustrated in FIG. 5. In FIG. 5, the same step numbers as those of the first embodiment are used to refer to the processing steps that are substantially identical to the processing steps of the corrosion inhibition processing described with regard to the first embodiment.

As illustrated in FIG. 5, when it is determined in Step S100 that the addition preparation has been completed (S100: YES) after this processing is initiated, it is determined whether or not the aqueous urea solution pressure PN is lowered (S110). In this Step S110, it is determined that the aqueous urea solution pressure PN is lowered when the aqueous urea solution pressure PN is equal to or lower than a first predetermined pressure PNTS1. A value that is equal to the predetermined pressure PNTS described with regard to the first embodiment is set as the first predetermined pressure PNTS1. Preferably, it is determined in this Step S110 as well that the aqueous urea solution pressure PN is lowered when a state where the aqueous urea solution pressure PN is equal to or lower than the first predetermined pressure PNTS1 continues for at least the specified period TT so that it is determined that the state where the aqueous urea solution pressure PN is equal to or lower than the first predetermined pressure PNTS1 is not an unexpected state but a state continuing to some extent.

When it is determined in Step S110 that the aqueous urea solution pressure PN is lowered (S110: YES), it is determined whether or not a counter K exceeds a counter determination value KTS (S120). This counter K is a value representing how many times the boost control is executed. The magnitude of the value of the counter determination value KTS is set such that it can be accurately determined, based on the counter K exceeding this counter determination value KTS, that the aqueous urea solution pressure PN is in a state where the lowered aqueous urea solution pressure PN cannot be recovered even after the boost control is performed more than once.

When the counter K exceeds the counter determination value KTS (S120: YES), the lowered aqueous urea solution pressure PN cannot be recovered in the current state despite the repeated execution of the boost control equivalent to the value of the counter determination value KTS. Accordingly, it can be speculated that this state where the aqueous urea solution pressure PN cannot be recovered as described above is because the aqueous urea solution amount RN in the tank 210 is decreased to the point of the pump 220 suctioning the air. In a case where this speculation is possible, it can be determined that the aqueous urea solution in the addition amount required for the cooling of the urea adding valve 230 cannot be supplied from the tank 210 to the urea adding valve 230 in the current state. Then, the return control is executed as in the first embodiment (S130). Then, the counter K is reset to "0" (S240) and this processing is terminated.

When the counter K is equal to or less than the counter determination value KTS (S120: NO), the boost control described above is performed once (S210) and the counter K is updated (S220). In Step S220, the update of the counter K is performed by "1" being added to the current value of the counter K.

Then, it is determined whether or not the aqueous urea solution pressure PN has been recovered (S230). In this Step S230, it is determined that the aqueous urea solution pressure PN has been recovered when the aqueous urea solution pressure PN reaches a second predetermined pressure PNTS2 set to a pressure higher than the first predetermined pressure PNTS1, more preferably, a second predetermined pressure PNTS2 set to a pressure close to the specified pressure, by the execution of the boost control in Step S210.

Then, when it is determined that the aqueous urea solution pressure PN has been recovered (S230: YES), the counter K is reset to "0" (S240) and this processing is terminated. When it is determined that the aqueous urea solution pressure PN has been recovered by the execution of the boost control in Step S210, the constant pressure control described above is initiated.

When it is determined that the aqueous urea solution pressure PN has yet to be recovered (S230: NO), the boost control is repeatedly executed, by the processing subsequent to Step S200 being executed, until the counter K exceeds the counter determination value KTS or until the aqueous urea solution pressure PN is recovered with the counter K being equal to or less than the counter determination value KTS.

The following effect can be achieved, in addition to the above-described effect of (i), by this embodiment described above.

(iii) When the aqueous urea solution pressure PN is equal to or lower than the first predetermined pressure PNTS1, the boost control for increasing the aqueous urea solution pressure PN by increasing the rotation speed of the pump 220 is repeatedly executed. Then, the following determination is made when the aqueous urea solution pressure PN does not reach the second predetermined pressure PNTS2 set to the pressure higher than the first predetermined pressure PNTS1 and the aqueous urea solution pressure PN cannot be recovered even if the counter K representing how many times the boost control is executed exceeds the counter determination value KTS. In other words, it is determined that the current state does not allow the supply of the aqueous urea solution in the addition amount required for the cooling of the urea adding valve 230 from the tank 210 to the urea adding valve 230.

Accordingly, it can be appropriately determined, without the aqueous urea solution amount RN in the tank 210 being referred to, that the current state does not allow the supply of the aqueous urea solution in the addition amount required for the cooling of the urea adding valve 230 from the tank 210 to the urea adding valve 230.

In addition, since the aqueous urea solution amount RN in the tank 210 is not referred to, it can be appropriately determined, even without the inclination of the liquid surface of the aqueous urea solution and the thawing amount of the aqueous urea solution in the tank 210 being taken into account, that the current state does not allow the supply of the aqueous urea solution in the addition amount required for the cooling of the urea adding valve 230 from the tank 210 to the urea adding valve 230.

Each of the embodiments described above can be put into practice after being modified as follows. As described above, the liquid surface of the aqueous urea solution approaches the suction port of the pump 220, even if the aqueous urea solution amount RN in the tank 210 is a sufficient amount, when the height of the liquid surface of the aqueous urea solution in the vicinity of the suction port of the pump 220 is decreased by the inclination of the liquid surface of the aqueous urea solution caused by the inclination of the vehicle. Accordingly, the mixing of the pump 220 with the air becomes increasingly likely to occur, and the aqueous urea solution in the addition amount required for the cooling of the urea adding valve 230 cannot be supplied from the tank 210 to the urea adding valve 230 when the pump 220 is actually mixed with the air.

Figure 6:
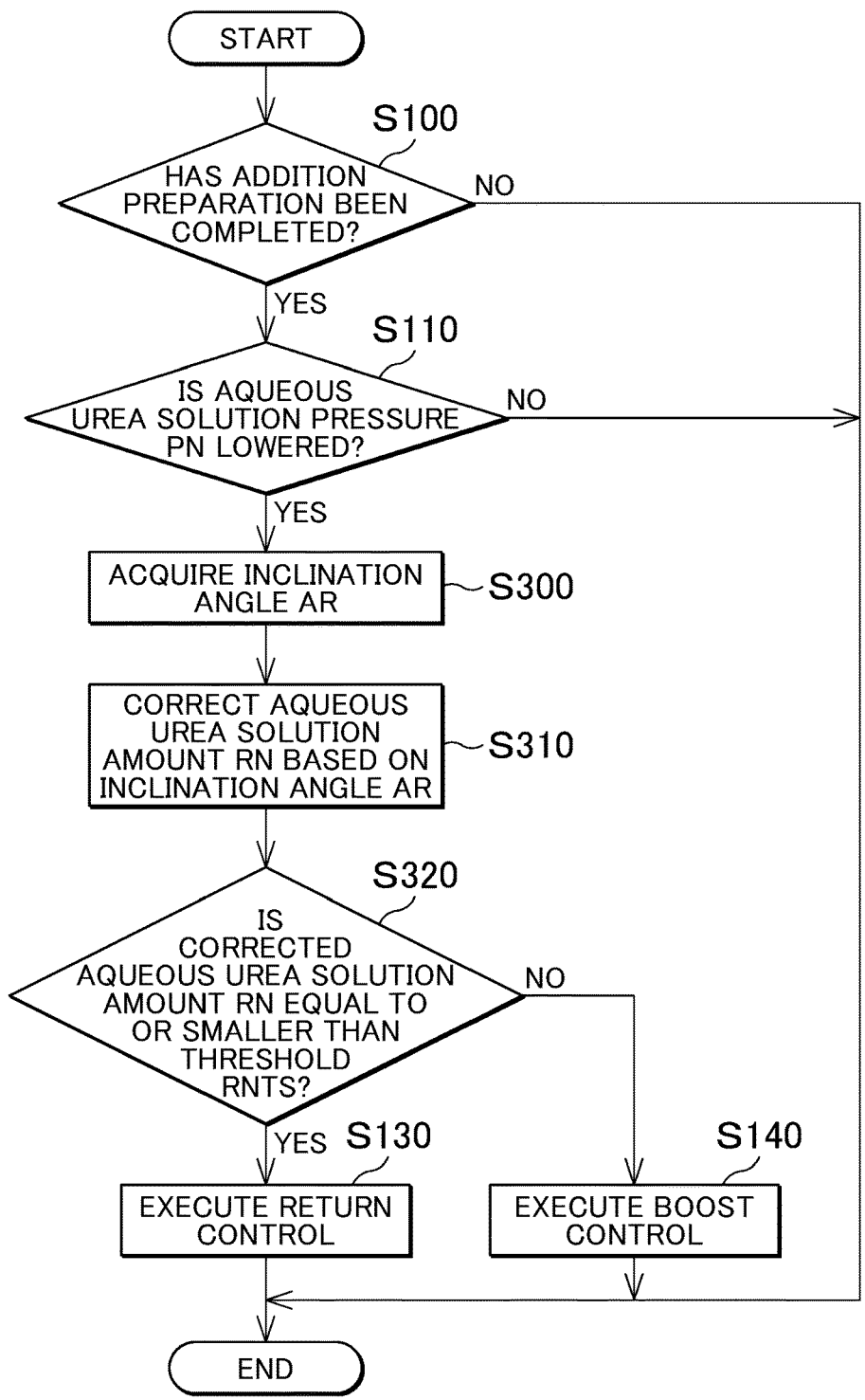
FIG. 6 is a flowchart illustrating a procedure of a corrosion inhibition processing according to a modification example of the first embodiment.

In a case where the corrosion inhibition processing described with regard to the first embodiment described above is executed, the aqueous urea solution amount RN that is detected by the level sensor 280 may be corrected based on the inclination angle AR detected by the inclination angle sensor 25. An example of a procedure of the corrosion inhibition processing according to this modification example is illustrated in FIG. 6.

When it is determined that the aqueous urea solution pressure PN is lowered in Step S110 of the corrosion inhibition processing described with regard to the first embodiment (S110: YES), the electronic control unit 80 acquires the inclination angle AR (S300) as illustrated in FIG. 6. Then, the aqueous urea solution amount RN is corrected based on the acquired inclination angle AR (S310). In this Step S310, the aqueous urea solution amount RN is corrected such that the corrected aqueous urea solution amount RN decreases as the inclination angle AR increases in a case where, for example, the height from the suction port of the pump 220 to the liquid surface decreases as the inclination angle AR increases in a horizontal direction.

Then, it is determined whether or not the corrected aqueous urea solution amount RN corrected based on the inclination angle AR is equal to or smaller than the threshold RNTS (S320). When the corrected aqueous urea solution amount RN is equal to or smaller than the threshold RNTS (S320: YES), the return control described above is executed as in Step S130 described above. When the corrected aqueous urea solution amount RN exceeds the threshold RNTS (S320: NO), the boost control described above is executed as in Step S140 described above.

According to this modification example, the aqueous urea solution amount RN is corrected based on the inclination of the liquid surface of the aqueous urea solution, and thus it can be accurately determined whether or not the aqueous urea solution in the addition amount required for the cooling of the urea adding valve 230 cannot be supplied from the tank 210 to the urea adding valve 230 in the current state.

Because the liquid surface of the aqueous urea solution is inclined by an acceleration of the vehicle as well, an acceleration sensor that detects the acceleration of the vehicle or the like is disposed. The inclination of the liquid surface of the aqueous urea solution is estimated to increase as the acceleration of the vehicle detected by the acceleration sensor increases. The aqueous urea solution amount RN may also be corrected based on the magnitude of the estimated inclination of the liquid surface as well as the inclination angle AR described above.

As described above, the amount of the aqueous urea solution that can be supplied to the urea adding valve 230 is small, even if the amount of the aqueous urea solution in the tank 210 is a sufficient amount, in a state where the aqueous urea solution is frozen and the aqueous urea solution is not entirely thawed. Accordingly, when the cooling addition continues, the liquid surface of the aqueous urea solution that is thawed at a relatively early timing approaches the suction port of the pump 220. Accordingly, even in this case, the mixing of the pump 220 with the air becomes increasingly likely to occur, and the aqueous urea solution in the addition amount required for the cooling of the urea adding valve 230 cannot be supplied from the tank 210 to the urea adding valve 230 when the pump 220 is actually mixed with the air.

Figure 7:
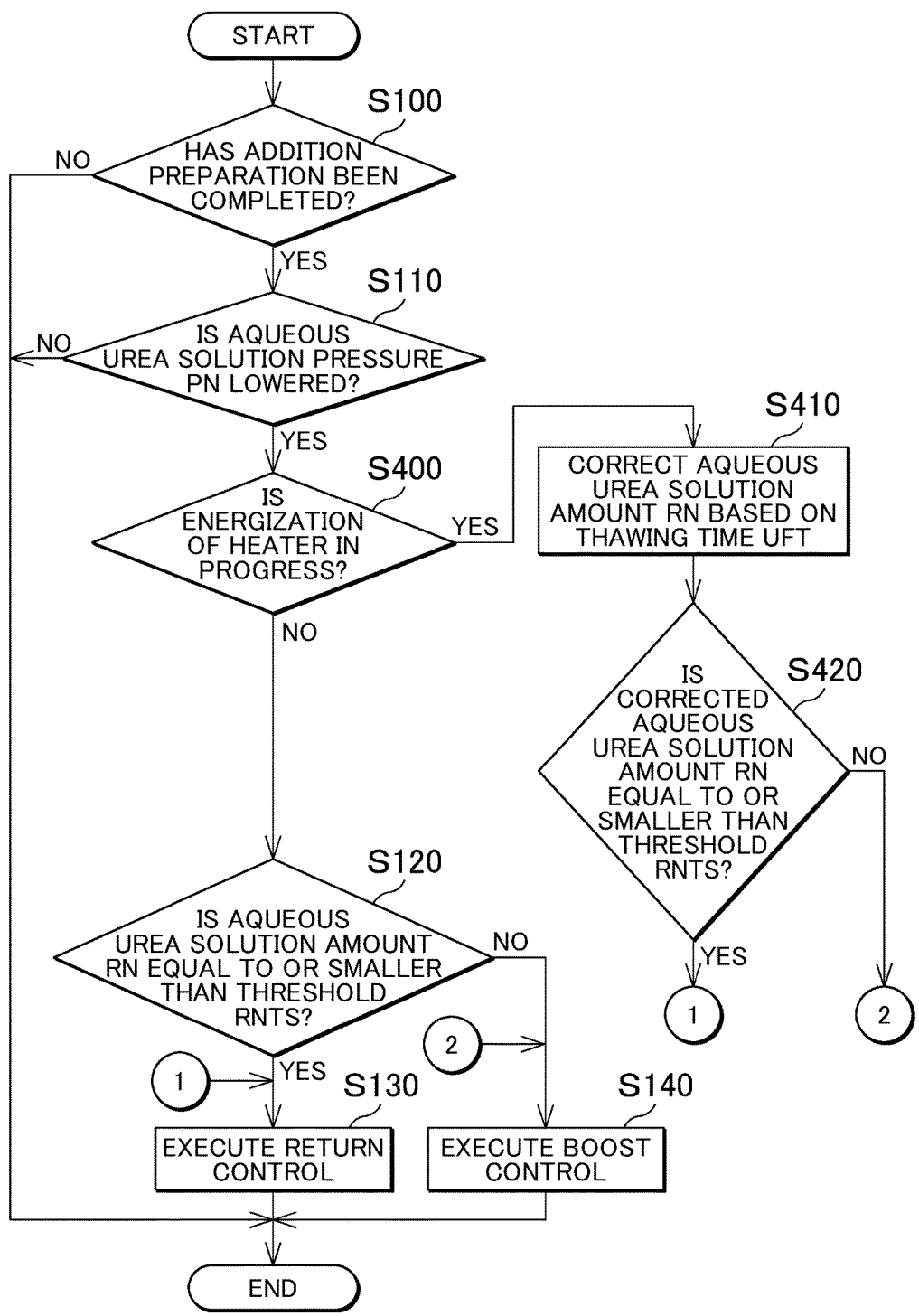
FIG. 7 is a flowchart illustrating a procedure of a corrosion inhibition processing according to a modification example of the first embodiment.

The amount of the aqueous urea solution that is thawed by the heater 290 increases in proportion to the length of the energization time of the heater 290, that is, the length of the aqueous urea solution thawing time. In a case where the corrosion inhibition processing described with regard to the first embodiment is executed, the electronic control unit 80 as a measuring unit measures a thawing time UFT of the aqueous urea solution thawed by the heater 290. More specifically, the electronic control unit 80 measures the energization time from the initiation of the energization of the heater 290 to the current point in time. Then, the aqueous urea solution amount RN detected by the level sensor 280 when it is determined that the aqueous urea solution in the tank 210 is highly likely to be frozen, that is, the aqueous urea solution amount RN detected by the level sensor 280 at a point in time when the thawing of the aqueous urea solution by the heater 290 is initiated, may be corrected based on the thawing time UFT. An example of a procedure of the corrosion inhibition processing according to this modification example is illustrated in FIG. 7.

When it is determined that the aqueous urea solution pressure PN is lowered in Step S110 of the corrosion inhibition processing described with regard to the first embodiment (S110: YES), it is determined whether or not the energization of the heater 290 is in progress (S400) as illustrated in FIG. 7. When the energization of the heater 290 is not in progress (S400: NO), the processing subsequent to Step S120 described with regard to the first embodiment is executed.

When the energization of the heater 290 is in progress (S400: YES), the thawing of the aqueous urea solution is currently in progress, and thus the measurement of the thawing time UFT is performed. Then, the amount of the thawed aqueous urea solution is calculated (S410) by the aqueous urea solution amount RN at the initiation of the thawing is corrected based on the thawing time UFT. This correction of the aqueous urea solution amount RN in Step S410 is carried out in, for example, the following manner.

In other words, at the point in time when the thawing of the aqueous urea solution by the heater 290 is initiated, the aqueous urea solution amount RN detected by the level sensor 280 at the initiation of the thawing of the aqueous urea solution is stored based on an assumption that the aqueous urea solution in the tank 210 is frozen in its entirety. Then, a correction value that is a value multiplied by the stored aqueous urea solution amount RN and is set based on the thawing time UFT is calculated. For example, this correction value is a value that is variably set within a range of "0" to "1", and "0" is set as the correction value when the thawing time UFT is "0". This correction value gradually increases as the thawing time UFT lengthens. Because of this correction, the corrected aqueous urea solution amount RN decreases as the thawing time UFT shortens, and the aqueous urea solution amount RN is corrected to be decreased in accordance with the thawing time UFT. This method for correcting the aqueous urea solution amount RN is an example, and the correction of the aqueous urea solution amount RN based on the thawing time UFT may be performed by another method insofar as the aqueous urea solution thawing amount in accordance with the thawing time UFT can be appropriately calculated.

Subsequently, it is determined whether or not the corrected aqueous urea solution amount RN corrected based on the thawing time UFT, that is, the current aqueous urea solution thawing amount, is equal to or smaller than the threshold RNTS (S420). When the corrected aqueous urea solution amount RN is equal to or smaller than the threshold RNTS (S420: YES), the return control described above is executed as in Step S130 described above. When the corrected aqueous urea solution amount RN exceeds the threshold RNTS (S420: NO), the boost control described above is executed as in Step S140 described above.

According to this modification example, the aqueous urea solution amount RN is corrected based on the thawing time UFT that is proportional to the amount of the thawed aqueous urea solution. Accordingly, it can be accurately determined whether or not the aqueous urea solution in the addition amount required for the cooling of the urea adding valve 230 cannot be supplied from the tank 210 to the urea adding valve 230 in the current state.

The numbers of the arranged oxidation catalyst 31, filter 32, SCR catalyst 41, and ammonia oxidation catalyst 51 can be appropriately changed. The numbers of the arranged exhaust gas temperature sensor and NOx sensor can be appropriately changed.

What is claimed is:

1. An aqueous urea solution supply device for an internal combustion engine, the internal combustion engine including an exhaust passage, the aqueous urea solution supply device comprising:
 a tank that stores aqueous urea solution;
 an urea adding valve disposed on the exhaust passage, the urea adding valve being configured to add the aqueous urea solution to exhaust gas of the internal combustion engine;
 an aqueous urea solution passage configured to supply the aqueous urea solution in the tank to the urea adding valve;
 a pump disposed on the aqueous urea solution passage;
 a pressure detection sensor configured to detect a pressure of the aqueous urea solution supplied to the urea adding valve;
 a water quantity detection sensor configured to detect an aqueous urea solution amount in the tank; and
 an electronic control unit configured to execute a return control, the return control being a control for returning the aqueous urea solution in the urea adding valve to the tank when the electronic control unit determines that the aqueous urea solution in an addition amount required for cooling of the urea adding valve is not supplied from the tank to the urea adding valve, wherein the electronic control unit determines that the aqueous urea solution in the addition amount required for the cooling of the urea adding valve is not supplied from the tank to the urea adding valve when the pressure of the aqueous urea solution detected by the pressure detection sensor is equal to or lower than a predetermined pressure and the aqueous urea solution amount detected by the water quantity detection sensor is equal to or smaller than a predetermined threshold.

2. The aqueous urea solution supply device according to claim 1, further comprising:
 an inclination detection sensor configured to detect an inclination of a liquid surface of the aqueous urea solution in the tank,
 wherein the electronic control unit is configured to correct the aqueous urea solution amount detected by the water quantity detection sensor based on the inclination of the liquid surface detected by the inclination detection sensor.

3. The aqueous urea solution supply device according to claim 1, further comprising:
 a heater configured to heat and thaw the aqueous urea solution in the tank,
 wherein the electronic control unit is configured to measure a thawing time of the aqueous urea solution thawed by the heater, and the electronic control unit is configured to correct the aqueous urea solution amount detected by the water quantity detection sensor based on the thawing time.

4. An aqueous urea solution supply device for an internal combustion engine, the internal combustion engine including an exhaust passage, the aqueous urea solution supply device comprising:
   a tank that stores at aqueous urea solution;
   an urea adding valve disposed on the exhaust passage, the urea adding valve being configured to add the aqueous urea solution to exhaust gas of the internal combustion engine;
   an aqueous urea solution passage configured to supply the aqueous urea solution in the tank to the urea adding valve;
   a pump disposed on the aqueous urea solution passage;
   a pressure detection sensor configured to detect a pressure of the aqueous urea solution supplied to the urea adding valve; and
   an electronic control unit configured to execute a return control, the return control being a control for returning the aqueous urea solution in the urea adding valve to the tank when the electronic control unit determines that the aqueous urea solution in an addition amount required for cooling of the urea adding valve is not supplied from the tank to the urea adding valve,
   wherein the electronic control unit is configured to repeatedly execute a boost control when the pressure of the aqueous urea solution detected by the pressure detection sensor is equal to or lower than a first predetermined pressure, the boost control being a control for increasing the pressure of the aqueous urea solution by increasing a rotation speed of the pump,
   the electronic control unit is configured to determine that the aqueous urea solution in the addition amount required for the cooling of the urea adding valve is not supplied from the tank to the urea adding valve when the number of executions of the boost control exceeds a number of predetermined times and the pressure of the aqueous urea solution has yet to reach a second predetermined pressure, and
   the second predetermined pressure is higher than the first predetermined pressure.

5. An aqueous urea solution supply method for an internal combustion engine, the internal combustion engine including an exhaust passage, a tank, a urea adding valve, an aqueous urea solution passage, a pump, and an electronic control unit,
   the tank storing aqueous urea solution, the urea adding valve being disposed on the exhaust passage, the urea adding valve being configured to add the aqueous urea solution to exhaust gas of the internal combustion engine, the aqueous urea solution passage being configured to supply the aqueous urea solution in the tank to the urea adding valve, and the pump being disposed on the aqueous urea solution passage, wherein the internal combustion entitle further includes a pressure detection sensor configured to detect a pressure of the aqueous urea solution supplied to the urea adding valve and a water quantity detection sensor configured to detect an aqueous urea solution amount in the tank, the aqueous urea solution supply method comprising:
   returning the aqueous urea solution in the urea adding valve to the tank when the electronic control unit determines that the aqueous urea solution in an addition amount required for cooling of the urea adding valve is not supplied from the tank to the urea adding valve,
   wherein the electronic control unit determines that the aqueous urea solution in the addition amount required for the cooling of the urea adding valve is not supplied from the tank to the urea adding valve when the pressure of the aqueous urea solution detected by the pressure detection sensor is equal to or lower than a predetermined pressure and the aqueous urea solution amount detected by the water quantity detection sensor is equal to or smaller than a predetermined threshold.

6. An aqueous urea solution supply method for an internal combustion engine, the internal combustion engine including an exhaust passage, a tank, a urea adding valve, an aqueous urea solution passage, a pump, and an electronic control unit,
   the tank storing aqueous urea solution, the urea adding valve being disposed on the exhaust passage, the urea adding valve being configured to add the aqueous urea solution to exhaust gas of the internal combustion engine, the aqueous urea solution passage being configured to supply the aqueous urea solution in the tank to the urea adding valve, and the pump being disposed on the aqueous urea solution passage, the internal combustion engine further including a pressure detection sensor configured to detect a pressure of the aqueous urea solution supplied to the urea adding valve, the aqueous urea solution supply method comprising:
   returning the aqueous urea solution in the urea adding valve to the tank when the electronic control unit determines that the aqueous urea solution in an addition amount required for cooling of the urea adding valve is not supplied from the tank to the urea adding valve,
   wherein the electronic control unit repeatedly executes a boost control when the pressure of the aqueous urea solution detected by the pressure detection sensor is equal to or lower than a first predetermined pressure, the boost control being a control for increasing the pressure of the aqueous urea solution by increasing a rotation speed of the pump,
   the electronic control determines that the aqueous urea solution in the addition amount required for the cooling of the urea adding valve is not supplied from the tank to the urea adding valve when the number of executions of the boost control exceeds a number of predetermined times and the pressure of the aqueous urea solution has yet to reach a second predetermined pressure, and
   the second predetermined pressure is higher than the first predetermined pressure.

\* \* \* \* \*